(12) United States Patent
Yeh

(10) Patent No.: US 12,321,640 B2
(45) Date of Patent: Jun. 3, 2025

(54) MEMORY MANAGEMENT METHOD, MEMORY STORAGE DEVICE AND MEMORY CONTROL CIRCUIT UNIT

(71) Applicant: PHISON ELECTRONICS CORP., Miaoli (TW)

(72) Inventor: Yen Chen Yeh, Hsinchu (TW)

(73) Assignee: PHISON ELECTRONICS CORP., Miaoli (TW)

( * ) Notice: Subject to any disclaimer, the term of this patent is extended or adjusted under 35 U.S.C. 154(b) by 99 days.

(21) Appl. No.: 18/349,962

(22) Filed: Jul. 11, 2023

(65) Prior Publication Data

US 2024/0402943 A1     Dec. 5, 2024

(30) Foreign Application Priority Data

May 31, 2023   (TW) ................................. 112120278

(51) Int. Cl.
*G06F 3/06* (2006.01)
*G06F 12/02* (2006.01)

(52) U.S. Cl.
CPC ............ *G06F 3/0659* (2013.01); *G06F 3/061* (2013.01); *G06F 3/0634* (2013.01);
(Continued)

(58) Field of Classification Search
CPC ...... G06F 3/0659; G06F 3/061; G06F 3/0634; G06F 3/0673; G06F 3/064; G06F 3/0679;
(Continued)

(56) References Cited

U.S. PATENT DOCUMENTS

2013/0232296 A1* 9/2013 Yonezawa ........... G06F 12/0246
711/103
2016/0092128 A1* 3/2016 Jain ....................... G06F 3/0647
711/103
(Continued)

FOREIGN PATENT DOCUMENTS

TW          I611410          1/2018

OTHER PUBLICATIONS

Chang, Li-Pin. "A hybrid approach to NAND-flash-based solid-state disks." IEEE Transactions on Computers 59.10 (2010): 1337-1349. (Year: 2010).*
(Continued)

*Primary Examiner* — Nicholas J Simonetti
(74) *Attorney, Agent, or Firm* — JCIPRNET

(57) ABSTRACT

A memory management method, a memory storage device, and a memory control circuit unit are disclosed. The method is for a rewritable non-volatile memory module including first type physical units and second type physical units. The first type physical units adopt a first operation mode. The second type physical units adopt a second operation mode. The method includes: grouping a part of physical units in the second type physical units to a first reserved region and a second reserved region, and the physical units belonging to the first reserved region and the second reserved region are reserved for usage in a data merging operation; and performing a first data merging operation which includes: collecting first data from a source unit; selecting a target unit from the first reserved region or the second reserved region according to attribute of the source unit; and storing the first data to the target unit.

24 Claims, 14 Drawing Sheets

(52) U.S. Cl.
CPC ........ *G06F 3/0673* (2013.01); *G06F 12/0253* (2013.01); *G06F 2212/7202* (2013.01); *G06F 2212/7204* (2013.01); *G06F 2212/7205* (2013.01)

(58) Field of Classification Search
CPC ......... G06F 12/0253; G06F 2212/7202; G06F 2212/7204; G06F 2212/7205
See application file for complete search history.

(56) References Cited

U.S. PATENT DOCUMENTS

| | | | |
|---|---|---|---|
| 2016/0092129 A1* | 3/2016 | Agarwal | G11C 29/4401 714/764 |
| 2017/0068470 A1* | 3/2017 | Ravimohan | G06F 12/0246 |
| 2021/0342097 A1* | 11/2021 | Lin | G06F 3/06 |
| 2022/0121464 A1* | 4/2022 | Li | G06F 12/0246 |
| 2023/0317185 A1* | 10/2023 | Bhat | G06F 3/0616 |

OTHER PUBLICATIONS

Im, Soojun, and Dongkun Shin. "ComboFTL: Improving performance and lifespan of MLC flash memory using SLC flash buffer." Journal of Systems Architecture 56.12 (2010): 641-653. (Year: 2010)*

"Office Action of Taiwan Counterpart Application", issued on Jun. 6, 2024, pp. 1-5.

* cited by examiner

MEMORY MANAGEMENT METHOD, MEMORY STORAGE DEVICE AND MEMORY CONTROL CIRCUIT UNIT

CROSS-REFERENCE TO RELATED APPLICATION

This application claims the priority benefit of Taiwan application serial no. 112120278, filed on May 31, 2023. The entirety of the above-mentioned patent application is hereby incorporated by reference herein and made a part of this specification.

BACKGROUND

Technical Field

The invention relates to a memory management technology, and more particularly, to a memory management method, a memory storage device, and a memory control circuit unit.

Description of Related Art

Portable electronic devices such as mobile phones and notebook computers have grown rapidly in recent years, resulting in a rapid increase in consumer demand for storage media. Since a rewritable non-volatile memory module (for example, a flash memory) has features of non-volatility of data, power saving, small size, none mechanical structure, etc., it is very suitable for being built in the aforementioned various portable electronic devices.

In some types of memory storage devices, a cache region and a storage region are configured. When storing data, physical units of the cache region are first quickly written with data based on a single-level cell (SLC) programming mode. After filling the cache region, a part of physical units in the storage region may also be switched to write data based on the SLC programming mode. However, if the default physical units that may be operated in the SLC programming mode are exhausted, a garbage collection (GC) operation may be initiated. For example, the garbage collection operation may be performed synchronously along with a host writing operation to release new physical units for writing new data. However, although the garbage collection operation may be used to maintain continuous execution of the host writing operation, it may also cause significant drop or drastic change within a short period of time in a writing performance of the synchronously executed host writing operation.

SUMMARY

The invention provides a memory management method, a memory storage device, and a memory control circuit unit, which may optimize a data merging operation.

An exemplary embodiment of the invention provides a memory management method, which is applied to a rewritable non-volatile memory module. The rewritable non-volatile memory module includes multiple physical units. The physical units include multiple first type physical units and multiple second type physical units. The first type physical units adopt a first operation mode. The second type physical units adopt a second operation mode. The memory management method includes the following. A part of physical units in the second type physical units are grouped to a first reserved region and a second reserved region. The physical units belonging to the first reserved region and the second reserved region are reserved for usage in a data merging operation. A first data merging operation is performed, which includes the following. First data is collected from a source unit in the physical units. A target unit is selected from the first reserved region or the second reserved region according to an attribute of the source unit. The first data is stored to the target unit.

An exemplary embodiment of the invention further provides a memory storage device including a connection interface unit, a rewritable non-volatile memory module, and a memory control circuit unit. The connection interface unit is configured to be coupled to a host system. The memory control circuit unit is coupled to the connection interface unit and the rewritable non-volatile memory module. The rewritable non-volatile memory module includes multiple physical units, the physical units include multiple first type physical units and multiple second type physical units, and the first type physical units adopt a first operation mode, the second type physical units adopt a second operation mode, and the memory control circuit unit is configured to: group a part of physical units in the second type physical units to a first reserved region and a second reserved region, in which the physical units belonging to the first reserved region and the second reserved region are reserved for usage in a data merging operation; and perform a first data merging operation which includes: instructing to collect first data from a source unit in the physical units; selecting a target unit from the first reserved region or the second reserved region according to an attribute of the source unit; and instructing to store the first data to the target unit.

An exemplary embodiment of the invention further provides a memory control circuit unit configured to control a rewritable non-volatile memory module. The rewritable non-volatile memory module includes multiple physical units, the physical units include multiple first type physical units and multiple second type physical units, the first type physical units adopt a first operation mode, and the second type physical units adopt a second operation mode. The memory control circuit unit includes a host interface, a memory interface, and a memory management circuit. The host interface is configured to be coupled to a host system. The memory interface is configured to be coupled to the rewritable non-volatile memory module. The memory management circuit is coupled to the host interface and the memory interface. The memory management circuit is configured to: group a part of physical units in the second type physical units to a first reserved region and a second reserved region, in which the physical units belonging to the first reserved region and the second reserved region are reserved for usage in a data merging operation; and perform a first data merging operation which includes: instructing to collect first data from a source unit in the physical units; selecting a target unit from the first reserved region or the second reserved region according to an attribute of the source unit; and instructing to store the first data to the target unit.

Based on the above, the rewritable non-volatile memory module includes the first type physical units and the second type physical units. The first type physical units adopt the first operation mode. The second type physical units adopt the second operation mode. After grouping a part of physical units in the second type physical units to the first reserved region and the second reserved region for reserving for usage in a data merging operation, the first data merging operation is performed. In the first data merging operation, the first data is collected from the source unit, and the target unit is selected from the first reserved region or the second reserved region according to an attribute of the source unit to store the first data. By optimizing the data merging operation, writing stability of the rewritable non-volatile memory module during the data merging operation is improved.

DESCRIPTION OF THE EMBODIMENTS

Generally, a memory storage device (which is also referred to as a memory storage system) includes a rewritable non-volatile memory module and a controller (which is also referred to as a control circuit). The memory storage device may be used together with a host system such that the host system may write data to or read data from the memory storage device.

Figure 1:
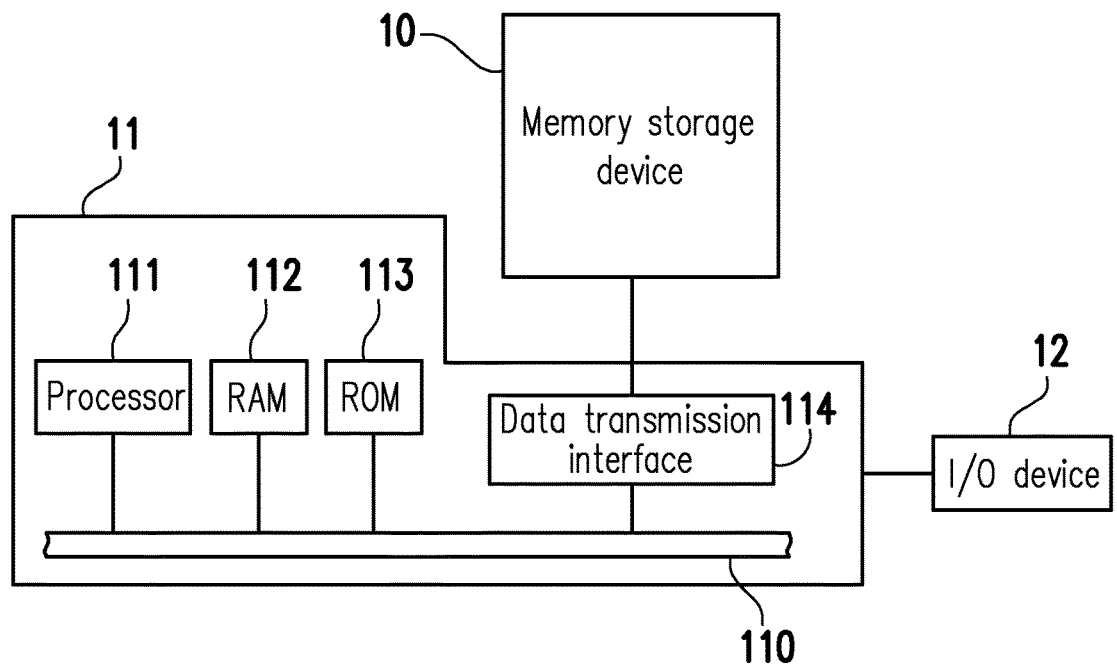
FIG. 1 is a schematic diagram of a host system, a memory storage device and an input/output (I/O) device according to an exemplary embodiment of the invention.
Figure 2:
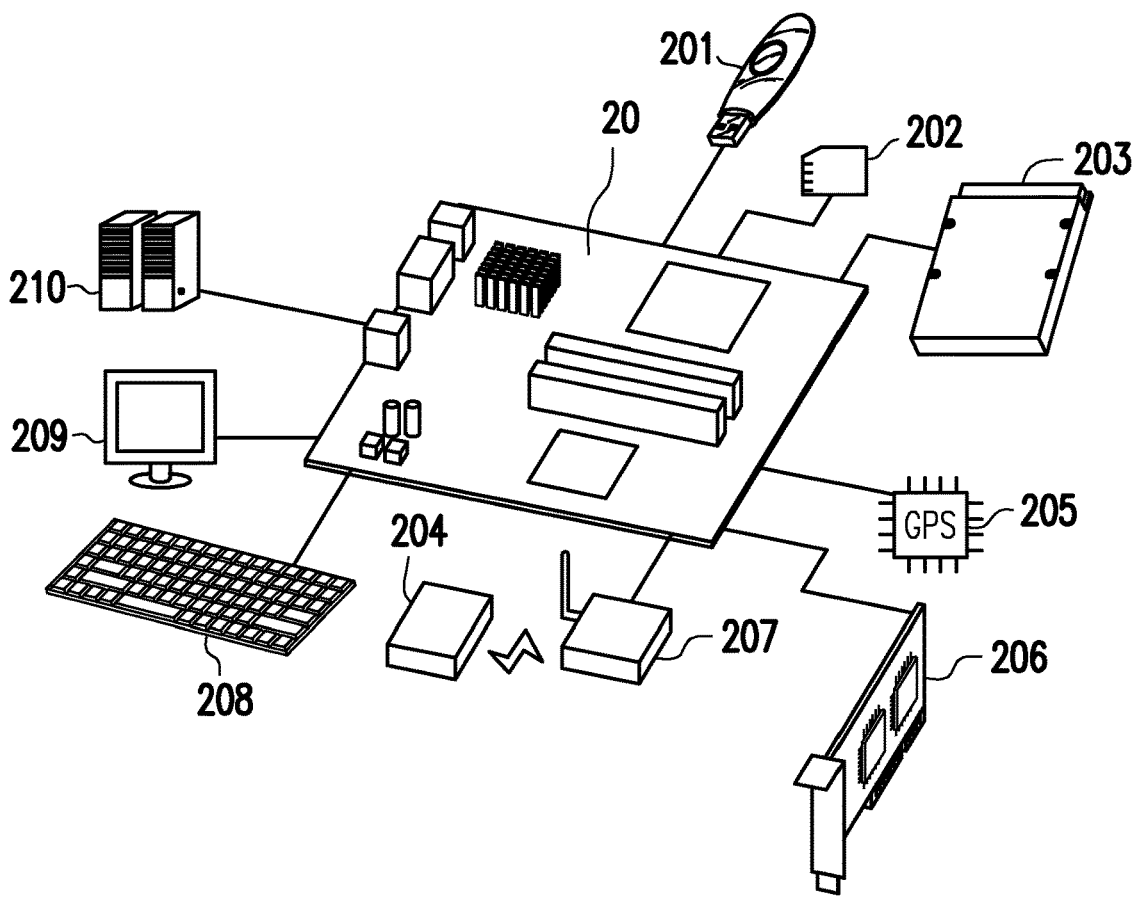
FIG. 2 is a schematic diagram of the host system, the memory storage device and the I/O device according to an exemplary embodiment of the invention.

FIG. 1 is a schematic diagram of a host system, a memory storage device and an input/output (I/O) device according to an exemplary embodiment of the invention. FIG. 2 is a schematic diagram of the host system, the memory storage device and the I/O device according to an exemplary embodiment of the invention.

Referring to FIG. 1 and FIG. 2, a host system 11 may include a processor 111, a random access memory (RAM) 112, a read only memory (ROM) 113 and a data transmission interface 114. The processor 111, the RAM 112, the ROM 113 and the data transmission interface 114 may be coupled to a system bus 110.

In an exemplary embodiment, the host system 11 may be coupled to a memory storage device 10 through the data transmission interface 114. For example, the host system 11 may store data into the memory storage device 10 or read data from the memory storage device 10 through the data transmission interface 114. In addition, the host system 11 may be coupled to an I/O device 12 through the system bus 110. For example, the host system 11 may transmit an output signal to the I/O device 12 or receive an input signal from the I/O device 12 through the system bus 110.

In an exemplary embodiment, the processor 111, the RAM 112, the ROM 113 and the data transmission interface 114 may be disposed on a motherboard 20 of the host system 11. The number of the data transmission interfaces 114 may be one or more. Through the data transmission interface 114, the motherboard 20 may be coupled to the memory storage device 10 via a wired or wireless manner.

In an exemplary embodiment, the memory storage device 10 may be, for example, a flash drive 201, a memory card 202, a solid state drive (SSD) 203 or a wireless memory storage device 204. The wireless memory storage device 204 may be, for example, a near field communication (NFC) memory storage device, a wireless fax (WiFi) memory storage device, a Bluetooth (Bluetooth) memory storage device or a Bluetooth low energy memory storage device (for example, iBeacon) and other memory storage devices based on various wireless communication technologies. In addition, the motherboard 20 may also be coupled to various I/O devices such as a global positioning system (GPS) module 205, a network interface card 206, a wireless transmission device 207, a keyboard 208, a screen 209, a speaker 210, etc., through the system bus 110. For example, in an exemplary embodiment, the motherboard 20 may access the wireless memory storage device 204 through the wireless transmission device 207.

In an exemplary embodiment, the host system 11 is a computer system. In an exemplary embodiment, the host system 11 may be any system that may substantially cooperate with the memory storage device to store data. In an exemplary embodiment, the memory storage device 10 and the host system 11 may respectively include a memory storage device 30 and a host system 31 of FIG. 3.

Figure 3:
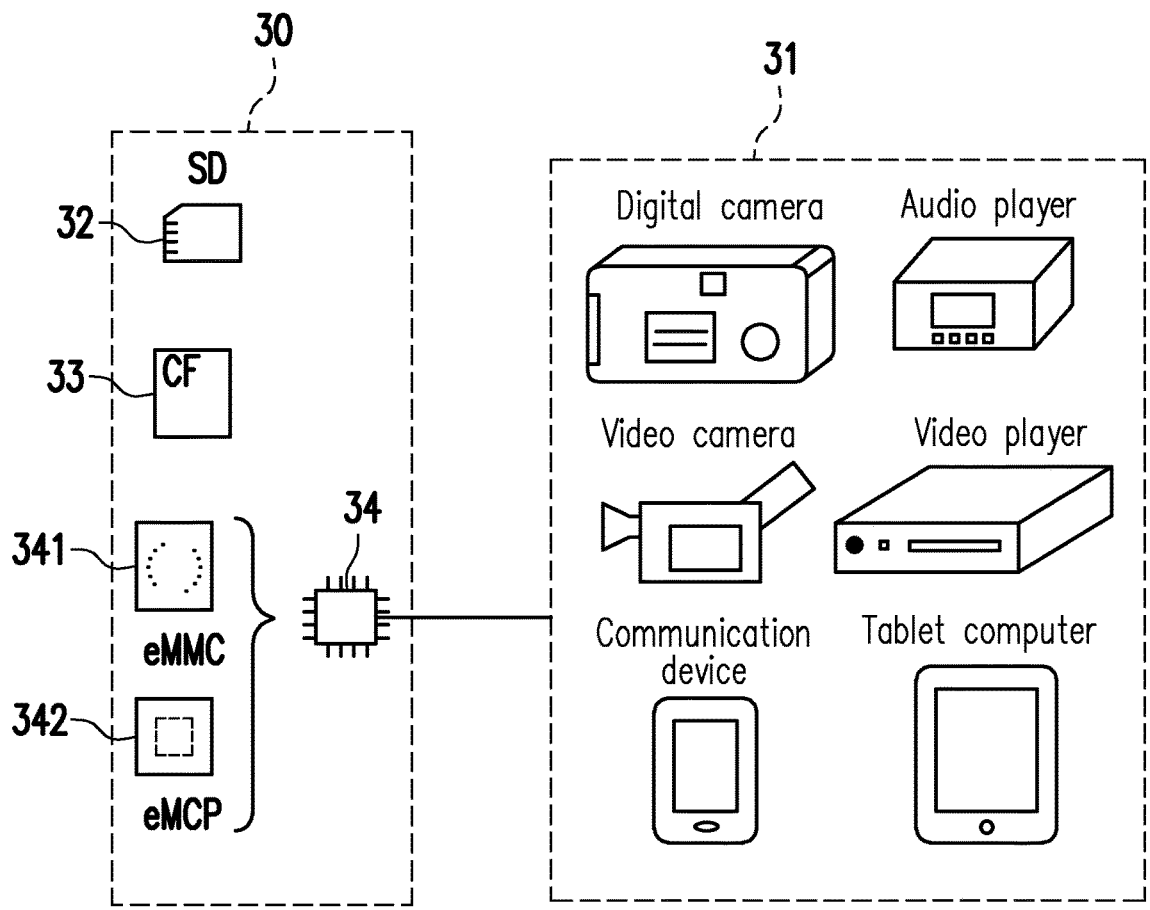
FIG. 3 is a schematic diagram of a host system and a memory storage device according to an exemplary embodiment of the invention.

FIG. 3 is a schematic diagram of a host system and a memory storage device according to an exemplary embodiment of the invention. Referring to FIG. 3, the memory storage device 30 may be used together with the host system 31 to store data. For example, the host system 31 may be a digital camera, a video camera, a communication device, an audio player, a video player, or a tablet computer, etc. For example, the memory storage device 30 may be various non-volatile memory storage devices such as a secure digital (SD) card 32, a compact flash (CF) card 33, or an embedded storage device 34, etc., used by the host system 31. The embedded storage device 34 includes an embedded multi-media card (eMMC) 341 and/or an embedded multi chip package (eMCP) storage device 342 and other types of embedded storage devices that directly couple the memory module to a substrate of the host system.

Figure 4:
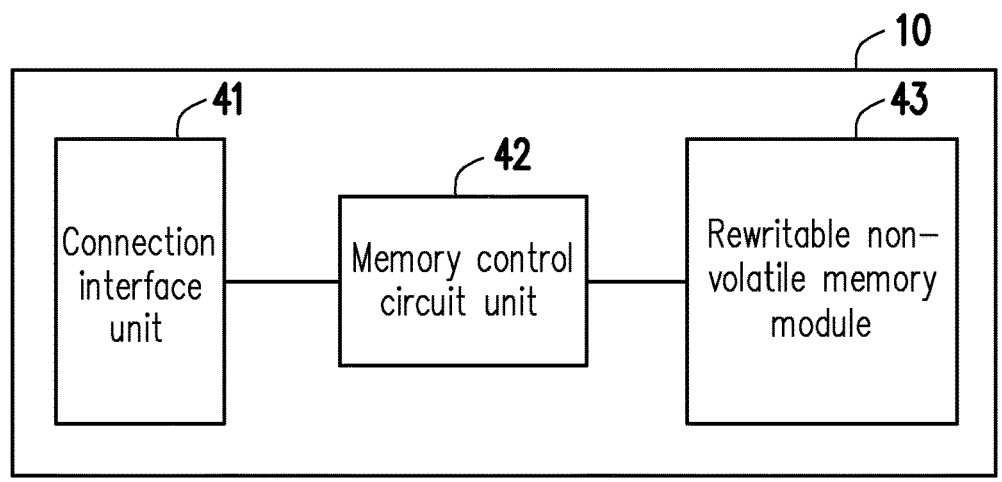
FIG. 4 is a schematic diagram of a memory storage device according to an exemplary embodiment of the invention.

FIG. 4 is a schematic diagram of a memory storage device according to an exemplary embodiment of the invention. Referring to FIG. 4, the memory storage device 10 includes a connection interface unit 41, a memory control circuit unit 42 and a rewritable non-volatile memory module 43.

The connection interface unit 41 is used to couple the memory storage device 10 to the host system 11. The memory storage device 10 may communicate with the host system 11 through the connection interface unit 41. In an exemplary embodiment, the connection interface unit 41 is compatible with a peripheral component interconnect express (PCI Express) standard. In an exemplary embodiment, the connection interface unit 41 may also be in complied with a serial advanced technology attachment (SATA) standard, a parallel advanced technology attachment (PATA) standard, an institute of electrical and electronic engineers (IEEE) 1394 standard, a universal serial bus (USB) standard, an SD interface standard, an ultra high speed-I (UHS-I) interface standard, an ultra high speed-II (UHS-II) interface standard, a memory stick (MS) interface standard, an MCP interface standard, an MMC interface standard, an eMMC interface standard, a universal flash storage (UFS) interface standard, an eMCP interface standard, a CF interface standard, an integrated device electronics (IDE) standard, or other suitable standards. The connection interface unit 41 and the memory control circuit unit 42 may be packaged in a same chip, or the connection interface unit 41 is arranged outside a chip including the memory control circuit unit 42.

The memory control circuit unit 42 is coupled to the connection interface unit 41 and the rewritable non-volatile memory module 43. The memory control circuit unit 42 is configured to execute multiple logic gates or control instructions implemented in the form of hardware or firmware and perform data writing, reading and erasing operations in the rewritable non-volatile memory module 43 according to instructions of the host system 11.

The rewritable non-volatile memory module 43 is configured to store the data written by the host system 11. The rewritable non-volatile memory module 43 may include a single level cell (SLC) NAND flash memory module (i.e., a flash memory module that may store 1 bit in a memory cell), a multi-level cell (MLC) NAND flash memory module (i.e., a flash memory module that may store 2 bits in a memory cell), a triple level cell (TLC) NAND flash memory module (i.e., a flash memory module that may store 3 bits in a memory cell), a quad level cell (QLC) NAND flash memory module (i.e., a flash memory module that may store 4 bits in a memory cell), other flash memory modules, or other memory modules with the same characteristics.

Each memory cell in the rewritable non-volatile memory module 43 stores one or more bits through a change of a voltage (which is referred to as threshold voltage hereinafter). Specifically, there is a charge trapping layer between a control gate of each memory cell and a channel. By applying a writing voltage to the control gate, an amount of electrons in the charge trapping layer may be changed, thereby changing the threshold voltage of the memory cell. The operation of changing the threshold voltage of the memory cell is also referred to as "writing data into memory cell" or "programming memory cell". As the threshold voltage changes, each memory cell in the rewritable non-volatile memory module 43 has multiple storage states. By applying a reading voltage, it is possible to determine which storage state a memory cell belongs to, thereby obtaining one or multiple bits stored by the memory cell.

In an exemplary embodiment, the memory cells of the rewritable non-volatile memory module 43 may form multiple physical programming units, and these physical programming units may form multiple physical erasing units. Specifically, the memory cells on a same word line may form one or multiple physical programming units. If each memory cell may store 2 or more bits, the physical programming units on the same word line may be at least classified into lower physical programming units and upper physical programming units. For example, the least significant bit (LSB) of a memory cell belongs to the lower physical programming unit, and the most significant bit (MSB) of a memory cell belongs to the upper physical programming unit. Generally, in the MLC NAND flash memory, a writing speed of the lower physical programming unit is greater than that of the upper physical programming unit, and/or reliability of the lower physical programming unit is higher than that of the upper physical programming unit.

In an exemplary embodiment, physical programming unit is the smallest unit for programming data. Namely, physical programming unit is the smallest unit for writing data. For example, a physical programming unit may be a physical page or a physical sector. If the physical programming unit is a physical page, the physical programming units may include a data bit region and a redundancy bit region. The data bit region includes multiple physical sectors for storing user data, and the redundant bit region is used for storing system data (for example, management data such as error correction codes, etc.). In an exemplary embodiment, the data bit region includes 32 physical sectors, and a size of one physical sector is 512 bytes (byte, B). However, in other exemplary embodiments, the data bit region may also include 8, 16 or more or less physical sectors, and the size of each physical sector may also be larger or smaller. On the other hand, the physical erasing unit is the smallest unit for erasing data. Namely, each physical erasing unit contains the least number of memory cells that are erased all together. For example, the physical erasing unit is a physical block.

Figure 5:
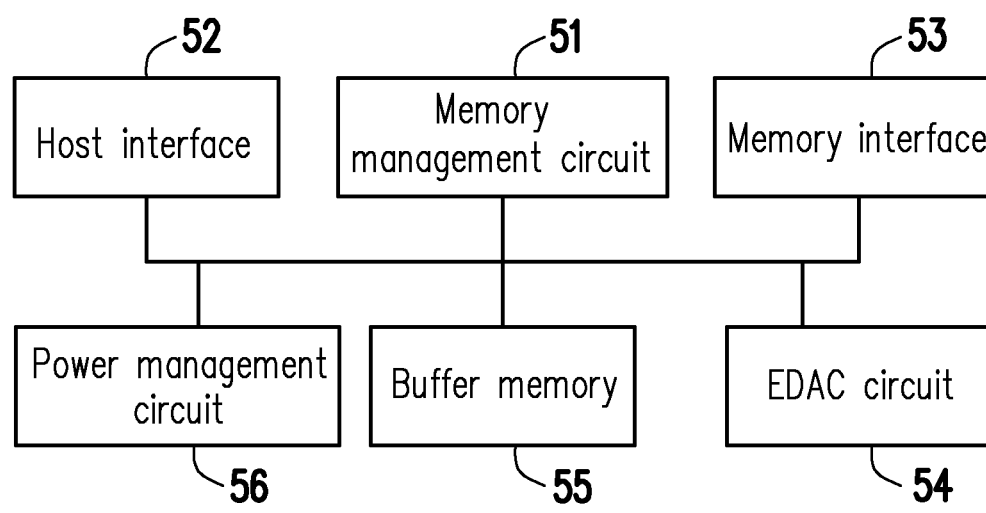
FIG. 5 is a schematic diagram of a memory control circuit unit according to an exemplary embodiment of the invention.

FIG. 5 is a schematic diagram of a memory control circuit unit according to an exemplary embodiment of the invention. Referring to FIG. 5, the memory control circuit unit 42 includes a memory management circuit 51, a host interface 52 and a memory interface 53.

The memory management circuit 51 is used to control an overall operation of the memory control circuit unit 42. Specifically, the memory management circuit 51 has multiple control instructions, and when the memory storage device 10 is operating, these control instructions are executed to perform data writing, reading and erasing operations. When describing the operation of the memory management circuit 51 below, it is equivalent to describing the operation of the memory control circuit unit 42.

In an exemplary embodiment, the control instructions of the memory management circuit 51 are implemented in a firmware form. For example, the memory management circuit 51 has a microprocessor unit (not shown) and a read-only memory (not shown), and these control instructions are burned into the read-only memory. When the memory storage device 10 is in operation, these control instructions are executed by the microprocessor unit to perform the data writing, reading, and erasing operations.

In an exemplary embodiment, the control instructions of the memory management circuit 51 may also be stored in a specific region of the rewritable non-volatile memory module 43 (for example, a system region in the memory module dedicated to store system data). In addition, the memory management circuit 51 has a microprocessor unit (not shown), a ROM (not shown) and a RAM (not shown). In particular, the ROM has a boot code, and when the memory control circuit unit 42 is enabled, the microprocessor unit may first execute the boot code to load the control instructions stored in the rewritable non-volatile memory module 43 into the RAM of the memory management circuit 51. Thereafter, the microprocessor unit executes these control instructions to perform the data writing, reading and erasing data operations.

In an exemplary embodiment, the control instructions of the memory management circuit 51 may also be implemented in a hardware form. For example, the memory management circuit 51 includes a microcontroller, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the microcontroller. The memory cell management circuit is configured to manage memory cells or memory cell groups of the rewritable non-volatile memory module 43. The memory writing circuit is configured to issue a writing instruction sequence to the rewritable non-volatile memory module 43 to write data into the rewritable non-volatile memory module 43. The memory reading circuit is configured to issue a reading instruction sequence to the rewritable non-volatile memory module 43 to read data from the rewritable non-volatile memory module 43. The memory erasing circuit is configured to issue an erasing instruction sequence to the rewritable non-volatile memory module 43 to erase data from the rewritable non-volatile memory module 43. The data processing circuit is configured to process data to be written into the rewritable non-volatile memory module 43 and data read from the rewritable non-volatile memory module 43. The writing instruction sequence, the reading instruction sequence and the erasing instruction sequence may respectively include one or multiple program codes or instruction codes and are configured to instruct the rewritable non-volatile memory module 43 to perform corresponding writing, reading and erasing operations. In an exemplary embodiment, the memory management circuit 51 may also issue other types of instruction sequences to the rewritable non-volatile memory module 43 to instruct the same to execute corresponding operations.

The host interface 52 is coupled to the memory management circuit 51. The memory management circuit 51 may communicate with the host system 11 through the host interface 52. The host interface 52 may be used to receive and identify instructions and data sent by the host system 11. For example, the instructions and data sent by the host system 11 may be transmitted to the memory management circuit 51 through the host interface 52. In addition, the memory management circuit 51 may transmit data to the host system 11 through the host interface 52. In the exemplary embodiment, the host interface 52 is compatible with the PCI express standard. However, it must be understood that the invention is not limited thereto, and the host interface 52 may also be compatible with the SATA standard, the PATA standard, the IEEE 1394 standard, the USB standard, the SD standard, the UHS-I standard, the UHS-II standard, the MS standard, the MMC standard, the eMMC standard, the UFS standard, the CF standard, the IDE standard or other suitable data transmission standards.

The memory interface 53 is coupled to the memory management circuit 51 and is configured to access the rewritable non-volatile memory module 43. For example, the memory management circuit 51 may access the rewritable non-volatile memory module 43 through the memory interface 53. Namely, the data to be written into the rewritable non-volatile memory module 43 may be converted into a format acceptable to the rewritable non-volatile memory module 43 through the memory interface 53. Specifically, if the memory management circuit 51 wants to access the rewritable non-volatile memory module 43, the memory interface 53 transmits the corresponding instruction sequences. For example, these instruction sequences may include a writing instruction sequence instructing to write data, a reading instruction sequence instructing to read data, an erasing instruction sequence instructing to erase data, and the corresponding instruction sequences instructing various memory operations (for example, changing a reading voltage level, etc.). These instruction sequences are, for example, generated by the memory management circuit 51 and sent to the rewritable non-volatile memory module 43 through the memory interface 53. These instruction sequences may include one or multiple signals, or data on the bus. These signals or data may include instruction codes or program codes. For example, in a reading instruction sequence, information such as a reading identification code and a memory address may be included.

In an exemplary embodiment, the memory control circuit unit 42 further includes an error detecting and correcting circuit 54, a buffer memory 55 and a power management circuit 56.

The error detecting and correcting circuit 54 is coupled to the memory management circuit 51 and configured to perform error detecting and correcting operations to ensure correctness of data. To be specific, when the memory management circuit 51 receives a writing instruction from the host system 11, the error detecting and correcting circuit 54 may generate a corresponding error correcting code (ECC) and/or an error detecting code (EDC) for data corresponding to the writing instruction, and the memory management circuit 51 may write the data corresponding to the writing instruction and the corresponding error correcting code and/or error detecting code into the rewritable non-volatile memory module 43. Thereafter, when the memory management circuit 51 reads data from the rewritable non-volatile memory module 43, it may simultaneously read the error correcting code and/or error detecting code corresponding to the data, and the error detecting and correcting circuit 54 may perform the error detecting and correcting operations on the read data according to the error correcting code and/or error detecting code. For example, the error detecting and correcting circuit 54 may support various encoding/decoding algorithms such as low density parity check code (LDPC code) or BCH.

The buffer memory 55 is coupled to the memory management circuit 51 and configured to temporarily store data. The power management circuit 56 is coupled to the memory management circuit 51 and configured to control a power supply of the memory storage device 10.

In an exemplary embodiment, the rewritable non-volatile memory module 43 of FIG. 4 may include a flash memory module. In an exemplary embodiment, the memory control circuit unit 42 of FIG. 4 may include a flash memory controller. In an exemplary embodiment, the memory management circuit 51 of FIG. 5 may include a flash memory management circuit.

The rewritable non-volatile memory module 43 may include multiple physical units. In an exemplary embodiment, one physical unit refers to a physical address or a physical programming unit. In an exemplary embodiment, one physical unit may also be composed of multiple continuous or discontinuous physical addresses. In an exemplary embodiment, one physical unit may also refer to a virtual block (VB). One virtual block may include multiple physical addresses or multiple physical programming units.

In an exemplary embodiment, the memory management circuit 51 may configure logical units 612(0)-612(C) to map the physical units. In an exemplary embodiment, each logical unit corresponds to a logical address. For example, one logical address may include one or multiple logical block addresses (LBA) or other logical management units.

In an exemplary embodiment, one logical unit may also correspond to a logical programming unit or consist of multiple continuous or discontinuous logical addresses.

It should be noted that one logical unit may be mapped to one or multiple physical units. If a certain physical unit is currently mapped by a certain logical unit, it means that the data currently stored in the physical unit includes valid data. Conversely, if a certain physical unit is not currently mapped by any logical unit, it means that the data currently stored in the physical unit is invalid data. In addition, the logic-to-physical mapping information describing the mapping relationship between the logical units and the physical units may be recorded in a logical-to-physical mapping table. Then, the memory management circuit 51 may access the rewritable non-volatile memory module 43 according to the information in the logical-to-physical mapping table.

Figure 6:
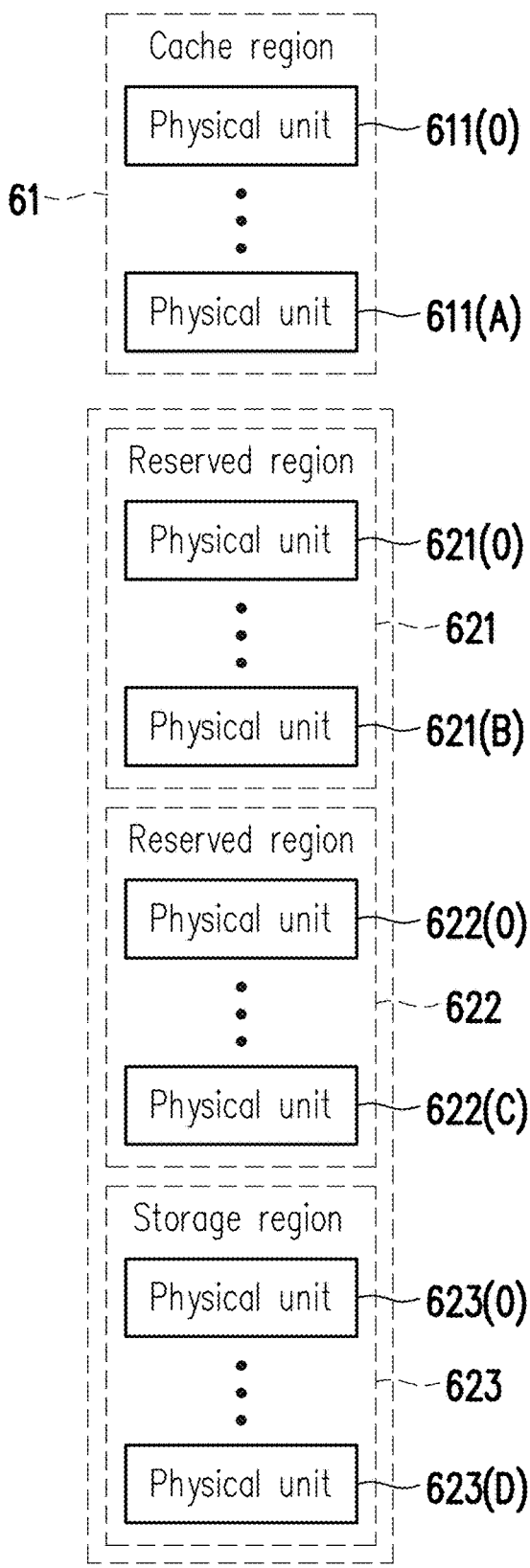
FIG. 6 is a schematic diagram of managing a rewritable non-volatile memory module according to an exemplary embodiment of the invention.

FIG. 6 is a schematic diagram of managing a rewritable non-volatile memory module according to an exemplary embodiment of the invention. Referring to FIG. 6, in an exemplary embodiment, the physical units in the rewritable non-volatile memory module 43 may be logically grouped into a cache region 61, a reserved region (also referred to as a first reserved region) 621, a reserved region (also referred to as a second reserved region) 622 and a storage region 623. For example, physical units 611(0)-611(A) may be grouped into the cache region 61, physical units 621(0)-621(B) may be grouped into the reserved region 621, physical units 622(0)-622(C) may be grouped into the reserved region 622, and the physical units 623(0)-623(D) may be grouped into the storage region 623.

In an exemplary embodiment, the physical units in the rewritable non-volatile memory module 43 may include first type of physical units and second type physical units. For example, each physical unit in the rewritable non-volatile memory module 43 may be one of the first type physical unit and the second type physical unit. The first type physical units and the second type physical units adopt different operation modes. For example, the first type physical units adopt a specific operation mode (which is also referred to as a first operation mode), and the second type physical units adopt another specific operation mode (which is also referred to as a second operation mode).

In an exemplary embodiment, in the rewritable non-volatile memory module 43, a total number of the first type physical units is less than a total number of the second type physical units. For example, the total number of the first type physical units may be about 5%-15% of the total number of the second type physical units, but the invention is not limited thereto.

In an exemplary embodiment, the memory management circuit 51 may group the first type physical units to the cache region 61. For example, the physical units 611(0)-611(A) are all the first type physical units. In addition, the memory management circuit 51 may group the second type physical units to the reserved region 621, the reserved region 622 and the storage region 623. For example, the physical units 621(0)-621(B), 622(0)-622(C) and 623(0)-623(D) in the reserved region 621, the reserved region 622 and the storage region 623 are all the second type physical units.

In an exemplary embodiment, the first type physical units may only be programmed based on a single programming mode (which is also referred to as a first programming mode), while the second type physical units may be programmed to store data based on multiple programming modes. For example, the second type physical units may be programmed to store data based on one of the first programming mode and another specific programming mode (which is also referred to as a second programming mode).

In an exemplary embodiment, the memory management circuit 51 may instruct the rewritable non-volatile memory module 43 to program the first type physical units based on the first programming mode, so as to store data in the first type physical units. In an exemplary embodiment, the memory management circuit 51 may instruct the rewritable non-volatile memory module 43 to program the second type physical units based on the first programming mode or the second programming mode (depending on a current operation requirement), so as to store data in the second type physical units.

In an exemplary embodiment, in a physical unit programmed based on the first programming mode, one memory cell may be used to store n bits. In an exemplary embodiment, in a physical unit programmed based on the second programming mode, one memory cell may be used to store m bits, where n is less than m. For example, n may be "1", and m may be a positive integer such as "2", "3" or "4". In an exemplary embodiment, n and m may also be other positive integers, as long as n is less than m.

In an exemplary embodiment, the first programming mode refers to one of an SLC programming mode, a pseudo SLC programming mode, a lower physical programming mode, a mixture programming mode and a less layer memory cell mode. In the SLC programming mode and the pseudo SLC programming mode, one memory cell only stores data of one bit. In the lower physical programming mode, only the lower physical programming units are programmed, and the upper physical programming units corresponding to the lower physical programming unit may not be programmed. In the mixture programming mode, valid data (or real data) may be programmed in the lower physical programming units, and at the same time dummy data may be programmed to the upper physical programming units corresponding to the lower physical programming units storing valid data. In the less layer memory cell mode, one memory cell stores data of a first number of bits. For example, the first number maybe set to "1".

In an exemplary embodiment, the second programming mode refers to an MLC programming mode, a TLC programming mode, a QLC programming mode or a similar mode. In the second programming mode, one memory cell may store data of a second number of bits, where the second number is equal to or greater than "2". For example, the second number may be set to "2", "3" or "4". In another exemplary embodiment, both of the first number in the first programming mode and the second number in the second programming mode may be other numbers, as long as the second number is greater than the first number.

In an exemplary embodiment, the performance of the programming operation performed based on the first programming mode may be higher than the performance of the programming operation performed based on the second programming mode. Therefore, compared with the second programming mode, to store the data to the rewritable non-volatile memory module 43 as instructed by a writing command from the host system 11 based on the first programming mode may improve a host writing performance of the rewritable non-volatile memory module 43. In an exemplary embodiment, reliability of the data stored based on the first programming mode may also be higher than reliability of the data stored based on the second programming mode.

In an exemplary embodiment, the memory management circuit 51 may start and execute a data merging operation. The data merging operation may be used to move or copy data (i.e. valid data) from the physical units programmed based on the first programming mode (which are also referred to as a source unit) to the physical units programmed based on the second programming mode (which are also referred to as a target unit). It should be noted that the source unit may be the first type physical units and/or the second type physical units, and the target unit is the second type physical units. In an exemplary embodiment, it is assumed that n and m are "1" and "4" respectively. Therefore, in the data merging operation, the data (i.e. valid data) stored in at least four physical units programmed based on the first programming mode may be read and centrally stored in one physical unit serving as the target unit based on the second programming mode. Thereafter, the physical units whose data (i.e., valid data) has been completely moved or copied may be erased to store new data from the host system 11.

In an exemplary embodiment, the memory management circuit 51 may group the first type physical units (such as the physical units 611(0)-611(A) in FIG. 6) into the cache region 61 and group a part of physical units in the second type physical units (such as the physical units 621(0)-621(B) and 622(0)-622(C) in FIG. 6) into the reserved regions 621 and 622. In particular, the physical units belonging to the reserved regions 621 and 622 may be reserved for the use in the data merging operation. Alternatively, from another point of view, the physical units belonging to the reserved regions 621 and 622 may only be used to store the data (i.e. valid data) collected from the source unit during the data merging operation, and cannot be used to store data not collected from the source unit during the data merging operation.

In an exemplary embodiment, the memory management circuit 51 may perform a data merging operation (which is also referred to as a first data merging operation). In the first data merging operation, the memory management circuit 51 may collect data (which is also referred to as first data) from the source unit. For example, the memory management circuit 51 may select multiple physical units currently storing valid data from the cache region 61 and/or the storage region 623 as the source unit. For example, the first data includes valid data stored in the source unit. The memory management circuit 51 may select the target unit from the reserved region 621 or 622 according to an attribute of the source unit. Then, the memory management circuit 51 may store the data collected from the source unit (i.e., the first data) into the target unit.

In an exemplary embodiment, the attribute of the source unit may reflect whether each physical unit in the source unit adopts the first operation mode or the second operation mode. From another point of view, the attribute of the source unit may reflect whether each physical unit in the source unit belongs to the first type physical unit or the second type physical unit.

In an exemplary embodiment, after the source unit is selected, the memory management circuit 51 may determine whether the source unit includes physical units adopting the first operation mode (i.e., the first type physical units) or physical units adopting the second operation mode (i.e., the second type physical units) according to the attribute of the source unit. The memory management circuit 51 may decide to select the target unit from the reserved region 621 or 622 according to a determination result.

In an exemplary embodiment, in response to multiple physical units in the source unit adopting the first operation mode (i.e., all of the physical units in the source unit are the first type physical units), the memory management circuit 51 may select at least one physical unit from the reserved region 621 to serve as the target unit. Alternatively, in an exemplary embodiment, in response to at least one physical unit in the source unit not adopting the first operation mode (i.e., not all of the physical units in the source unit are the first type physical units), the memory management circuit 51 may select at least one physical unit from the reserved region 622 to serve as the target unit. Then, the memory management circuit 51 may instruct the rewritable non-volatile memory module 43 to store the data collected from the source unit (i.e., the first data) into the selected target unit.

In an exemplary embodiment, after storing the first data in the target unit, the memory management circuit 51 may remove the target unit from the reserved region 621 or 622. For example, it is assumed that the target unit originally belongs to the reserved region 621, after programming the first data to the target unit based on the second programming mode, the memory management circuit 51 may remove the target unit from the reserved region 621 and re-associate (i.e., group) the target unit to storage region 623. At this time, a total number of physical units in the reserved region 621 decreases correspondingly. Alternatively, it is assumed that the target unit originally belongs to the reserved region 622, after programming the first data to the target unit based on the second programming mode, the memory management circuit 51 may remove the target unit from the reserved region 622 and re-associate (i.e., group) the target unit to storage region 623. At this time, a total number of physical units in the reserved region 622 decreases correspondingly.

Figure 7:
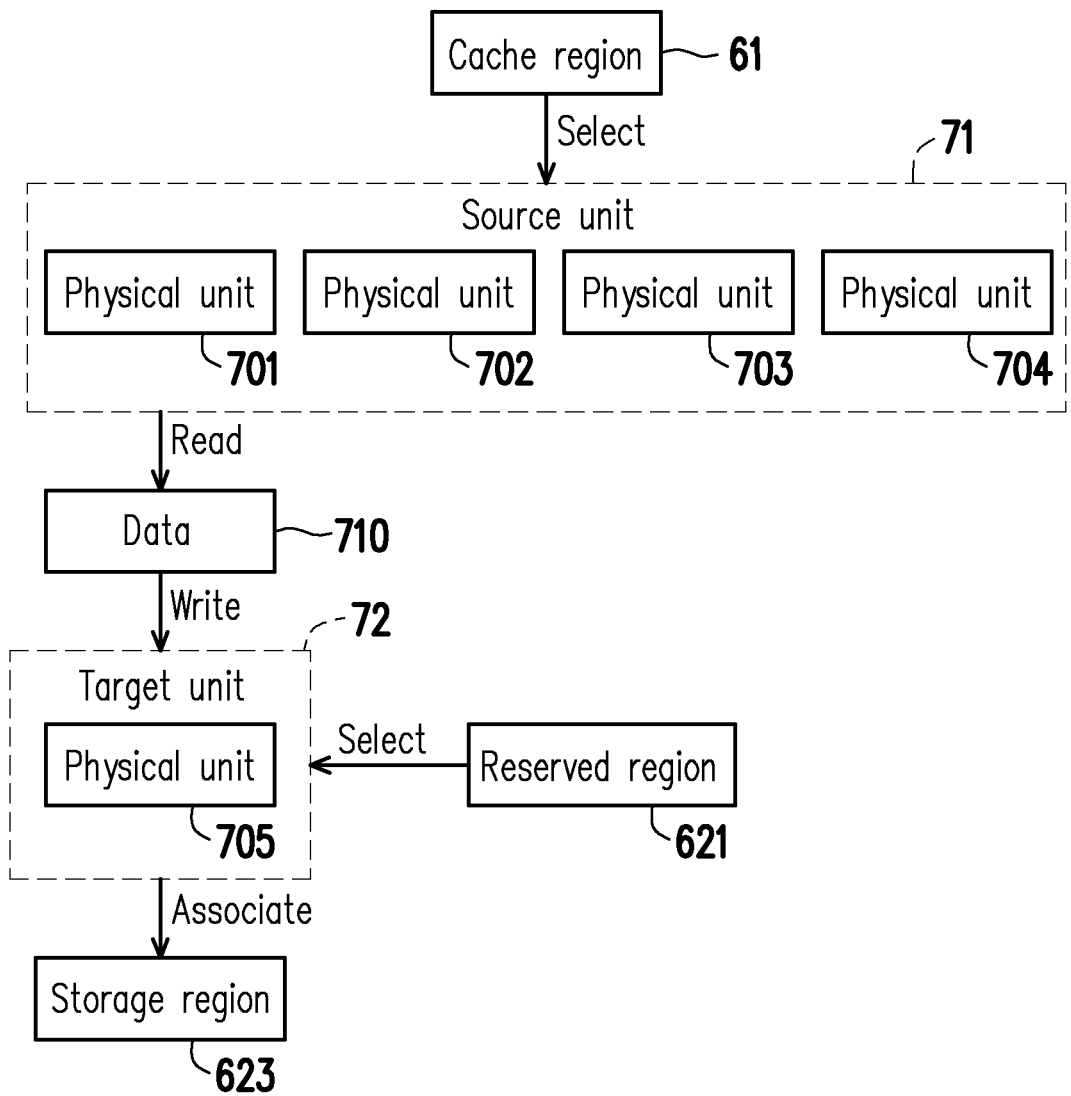
FIG. 7 is a schematic diagram of a data merging operation according to an exemplary embodiment of the invention.

FIG. 7 is a schematic diagram of a data merging operation according to an exemplary embodiment of the invention. Referring to FIG. 7, it is assumed that in the data merging operation, a source unit 71 includes physical units 701-704 selected from the cache region 61. In response to the fact that the physical units 701-704 in the source unit 71 are all the first type physical units, the memory management circuit 51 may select a physical unit 705 from the reserved region 621 to serve as a target unit 72.

In the data merging operation in FIG. 7, the memory management circuit 51 may instruct the rewritable non-volatile memory module 43 to read data 710 (i.e., the first data) from the physical units 701-704 serving as the source unit 71. For example, the data 710 includes valid data. The memory management circuit 51 may instruct the rewritable non-volatile memory module 43 to re-store the data 710 into the physical unit 705 serving as the target unit 72. It should be noted that the data 710 is originally dispersedly stored in the physical units 701-704 based on the first programming mode. In the data merging operation, the data 710 read from the physical units 701-704 is changed to be stored in the physical unit 705 based on the second programming mode. After filling the physical unit 705, the memory management circuit 51 may remove the physical unit 705 from the reserved region 621 and re-associate the physical unit 705 to the storage region 623.

Figure 8:
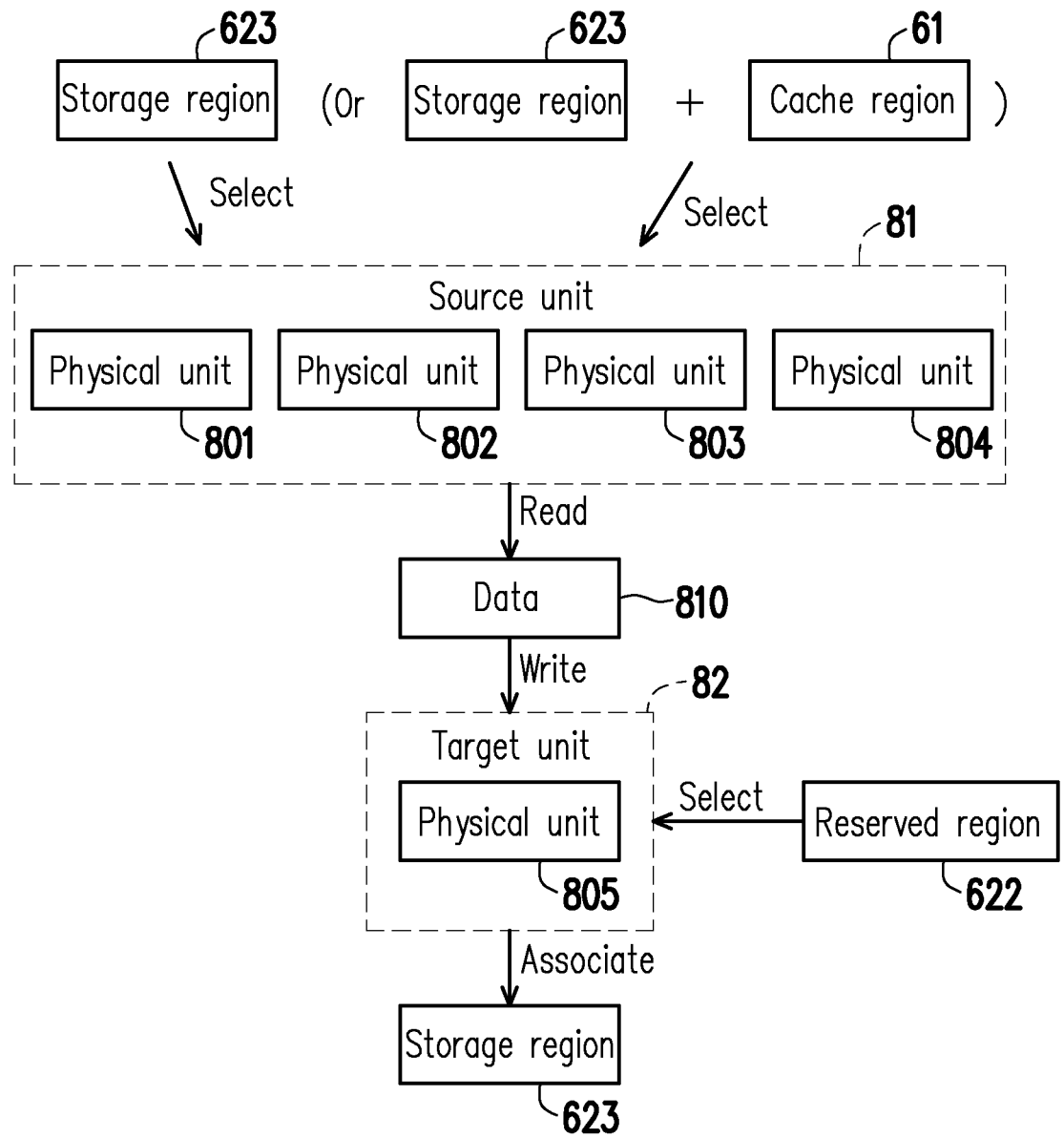
FIG. 8 is a schematic diagram of a data merging operation according to an exemplary embodiment of the invention.

FIG. 8 is a schematic diagram of a data merging operation according to an exemplary embodiment of the invention. Referring to FIG. 8, it is assumed that in the data merging operation, a source unit 81 includes physical units 801-804 selected from the storage region 623 (or the storage region 623 and the cache region 61). Namely, at least one of the physical units 801-804 (for example, the physical unit 801) is selected from the storage region 623. In response to the fact that the physical units 801-804 in the source unit 81 are not all of the first type physical units (for example, the physical unit 801 is the second type physical unit), the memory management circuit 51 may select the physical unit 805 from the reserved region 622 to serve as a target unit 82.

In the data merging operation of FIG. 8, the memory management circuit 51 may instruct the rewritable non-volatile memory module 43 to read data 810 (i.e., the first data) from the physical units 801-804 serving as the source unit 81. For example, the data 810 includes valid data. The memory management circuit 51 may instruct the rewritable non-volatile memory module 43 to re-store the data 810 into the physical unit 805 serving as the target unit 82. It should be noted that the data 810 is originally dispersedly stored in the physical units 801-804 based on the first programming mode. In the data merging operation, the data 810 read from the physical units 801-804 is changed to be stored in the physical unit 805 based on the second programming mode. After filling the physical unit 805, the memory management circuit 51 may remove the physical unit 805 from the reserved region 622 and re-associate the physical unit 805 to the storage region 623.

In an exemplary embodiment, after storing the first data to the target unit, the memory management circuit 51 may instruct the rewritable non-volatile memory module 43 to erase the source unit. On the other hand, the memory management circuit 51 may receive a writing command from the host system 11. The writing command instructs to store data (which is also referred to as second data). After erasing the source unit, the memory management circuit 51 may store the second data in the previously erased source unit according to the writing command. In other words, idle physical units (i.e., the erased source unit) released through the data merging operation may be reused to store new data (i.e., the second data) from the host system 11.

For example, in the exemplary embodiment of FIG. 7, after the data 710 is read from the source unit 71 and written into the target unit 72, the physical units 701-704 in the source unit 71 may be erased. Thereafter, the erased physical units 701-704 may be used to store new data (i.e., the second data) from the host system 11. Similarly, in the exemplary embodiment of FIG. 8, after the data 810 is read from the source unit 81 and written into the target unit 82, the physical units 801-804 in the source unit 81 may be erased. Thereafter, the erased physical units 801-804 may be used to store new data (i.e., the second data) from the host system 11.

It should be noted that, in the exemplary embodiment of FIG. 8, if the physical units in the reserved region 622 are insufficient (for example, the total number of physical units in the reserved region 622 is less than a threshold value), after erasing the physical units 801-804, the memory management circuit 51 may reset at least one of the physical units 801-804 (for example, the physical unit 801) as the target unit used in a next data merging operation (which is also referred to as a second data merging operation). In addition, the remained physical units (such as the physical units 802-804) in the physical units 801-804 may be used to store new data (i.e., the second data) from the host system 11. In this way, it is ensured that the next data merging operation (i.e., the second data merging operation) may be executed smoothly.

Figure 9:
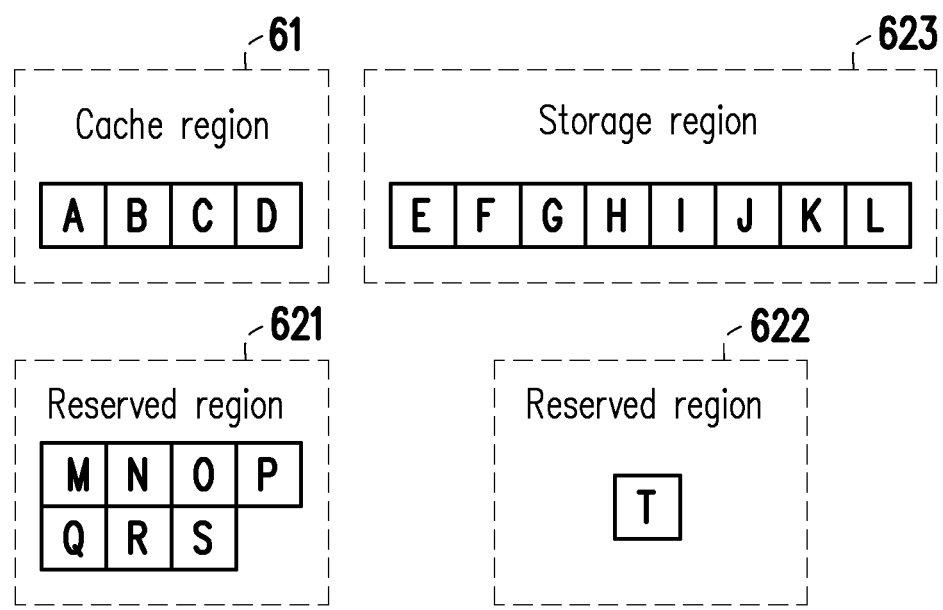
FIG. 9 to FIG. 10D are schematic diagrams illustrating synchronous execution of a data merging operation and a host writing operation according to an exemplary embodiment of the invention.
Figure 10A:
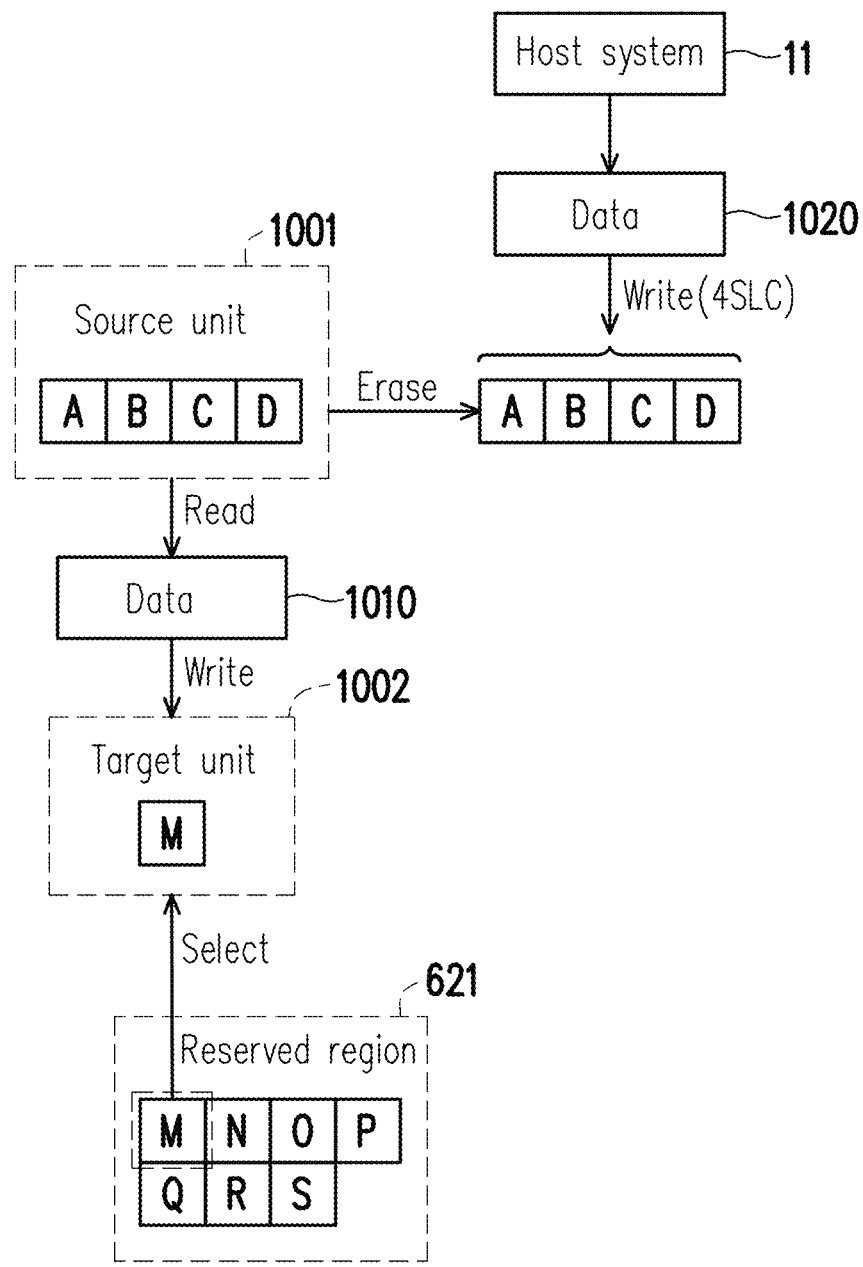
Figure 10B:
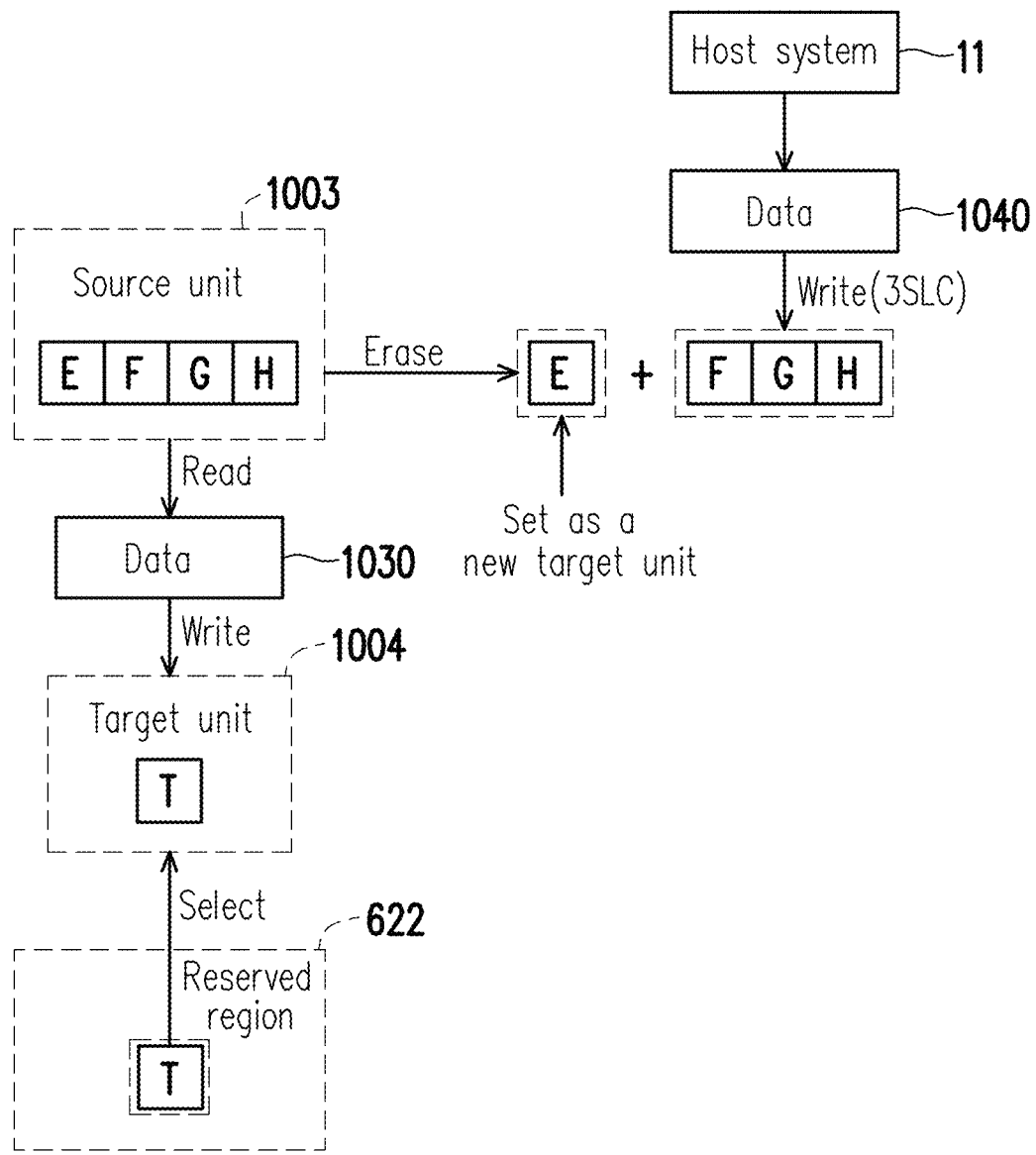
Figure 10C:
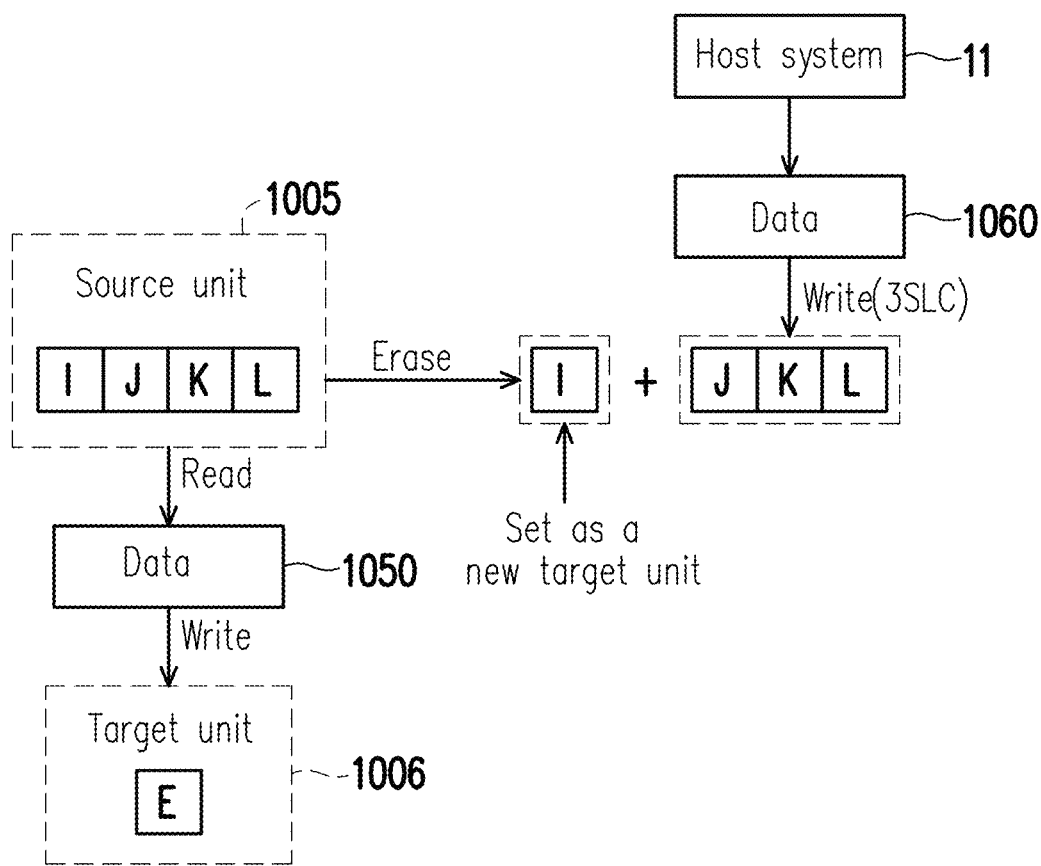
Figure 10D:
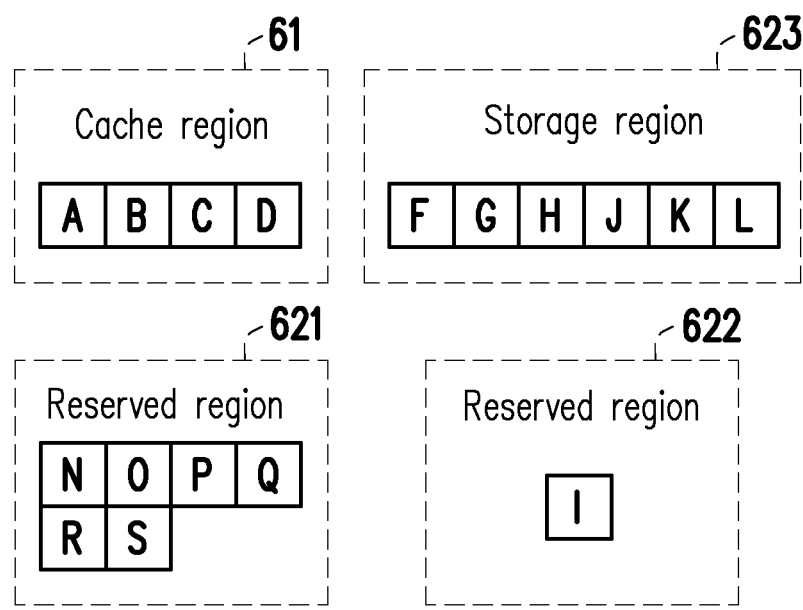

FIG. 9 to FIG. 10D are schematic diagrams illustrating synchronous execution of a data merging operation and a host writing operation according to an exemplary embodiment of the invention. Referring to FIG. 9, in an exemplary embodiment, it is assumed that the cache region 61 includes 4 physical units (marked as A-D), the storage region 623 includes 8 physical units (marked as E-L), the reserved region 621 includes 7 physical units (marked as M-S), and the reserved region 622 includes 1 physical unit (marked as T). In addition, it is assumed that all of the physical units A-L have been written with data.

Referring to FIG. 10A, continuing with the exemplary embodiment of FIG. 9, after starting the data merging operation, it is assumed that a source unit 1001 includes the physical units A-D selected from the cache region 61, a target unit 1002 may include a physical unit M selected from the reserved region 621. In the data merging operation, data 1010 (i.e., the first data) may be read from the physical units A-D serving as the source unit 1001 and stored in the physical unit M serving as the target unit 1002 based on the second programming mode. After the data 1010 is completely stored in the physical unit M, the physical units A-D may be erased. In addition, after the data 1010 is completely stored in the physical unit M, the physical unit M may be removed from the reserved region 621 and associated to the storage region 623. After the physical unit M is removed, the physical units N-S are remained in the reserved region 621.

On the other hand, after erasing the physical units A-D, the data 1020 (i.e., the second data) from the host system 11 may be stored in the physical units A-D originally serving as the source unit 1001 based on the first programming mode. It should be noted that, in the exemplary embodiment of FIG. 10A, a writing performance of storing the data 1020 in the physical units A-D may be regarded as a writing performance of 4 SLCs (indicating that the data 1020 may be written to 4 physical units based on the first programming mode).

Referring to FIG. 10B, continuing with the exemplary embodiment of FIG. 10A, in a next data merging operation, it is assumed that a source unit 1003 includes physical units E-H selected from the storage region 623, a target unit 1004 may include a physical unit T selected from the reserved region 622. In the data merging operation, data 1030 (i.e., the first data) may be read from the physical units E-H serving as the source unit 1003 and stored in the physical unit T serving as the target unit 1004 based on the second programming mode. After the data 1030 is completely stored in the physical unit T, the physical units E-H may be erased. In addition, after the data 1030 is completely stored in the entity unit T, the entity unit T may be removed from the reserved region 622 and associated to the storage region 623. After removing the physical unit T, there is no physical unit available in the reserved region 622.

On the other hand, after erasing the physical units E-H, the physical unit E may be set as a new target unit for the use of the next data merging operation. In addition, data 1040 (i.e., the second data) from the host system 11 may be stored in the physical units F-H originally serving as the source unit 1003 based on the first programming mode. It should be noted that, in the exemplary embodiment of FIG. 10B, a writing performance of storing data 1040 in the physical units F-H may be regarded as a writing performance of 3 SLCs (indicating that data 1040 may be written to 3 physical units based on the first programming mode). Regarding the host system 11, the writing performance of the 3 SLCs in the exemplary embodiment of FIG. 10B is slightly lower than the writing performance of the 4 SLCs in the exemplary embodiment of FIG. 10A.

Referring to FIG. 10C, continuing with the exemplary embodiment of FIG. 10B, in the next data merging operation, it is assumed that a source unit 1005 includes physical units I-L selected from the storage region 623, a target unit 1006 may include the physical unit E serving as the source unit 1003 in FIG. 10B. In the data merging operation, data 1050 (i.e., the first data) may be read from the physical units I-L serving as the source unit 1005 and stored in the physical unit E serving as the target unit 1006 based on the second programming mode. After the data 1050 is completely stored in the physical unit E, the physical units I-L may be erased. In addition, after the data 1050 is completely stored in the physical unit E, the physical unit E may be associated with the storage region 623.

On the other hand, after erasing the physical units I-L, the physical unit I may be set as a new target unit for the use of the next data merging operation. In addition, data 1060 (i.e., the second data) from the host system 11 may be stored in the physical units J-L originally serving as the source unit 1005 based on the first programming mode. It should be noted that, in the exemplary embodiment of FIG. 10C, a writing performance of storing data 1060 in the physical units F-H may be regarded as the writing performance of 3 SLCs (indicating that data 1060 may be written to 3 physical units based on the first programming mode).

Referring to FIG. 10D, after performing the three data merging operations and the corresponding host writing operations in FIG. 10A to FIG. 10C, the cache region 61 includes 4 physical units A-D, and the storage region 623 includes 6 physical units F-H, K-L, the reserved region 621 includes 6 physical units N-S, and the reserved region 622 includes the physical unit I selected as the next target unit in the exemplary embodiment of FIG. 10C. In an exemplary embodiment, the physical unit I serving as the next target unit may not be grouped to the reserved region 622, which is not limited by the invention.

Figure 11:
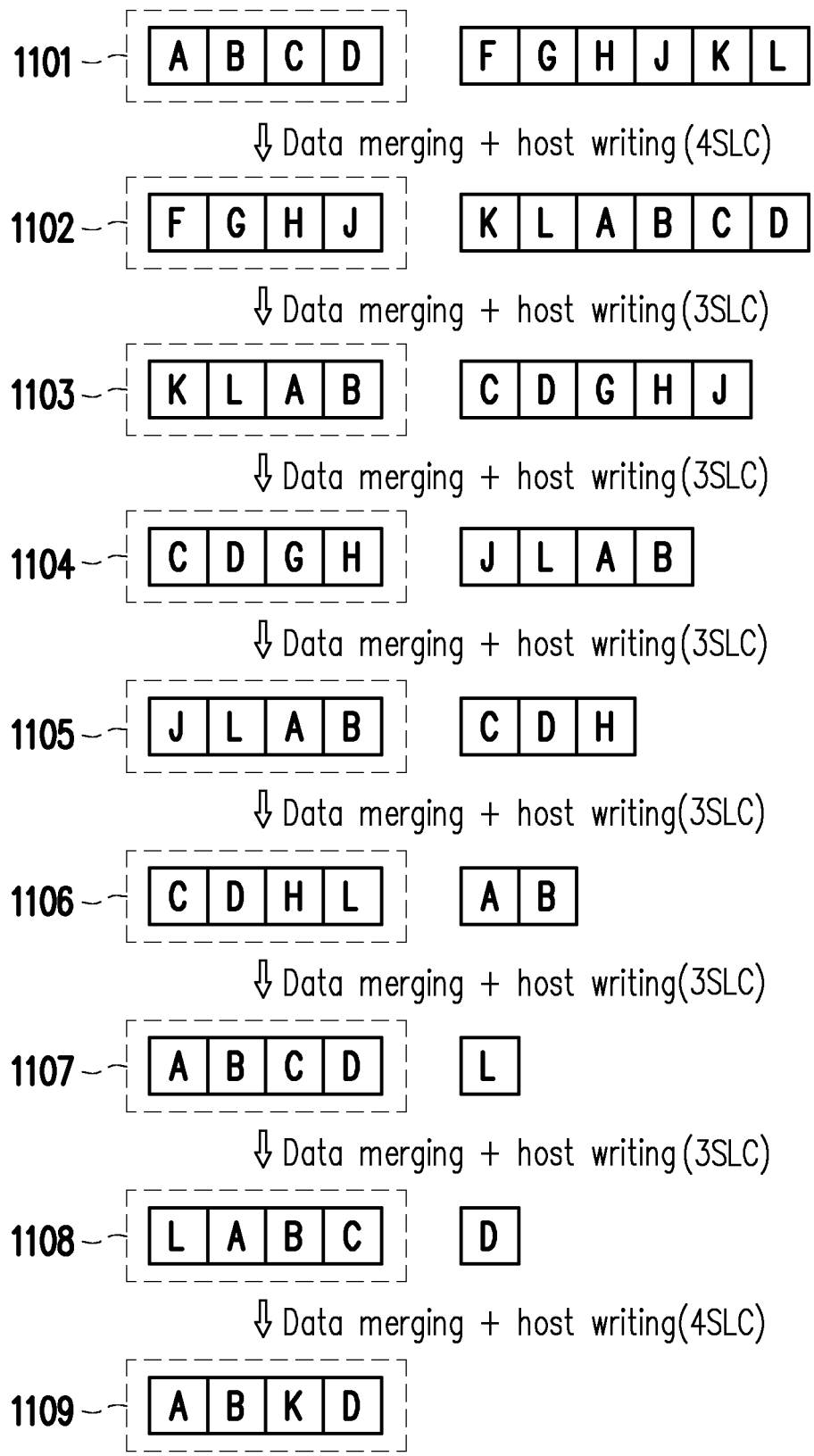
FIG. 11 is a schematic diagram illustrating synchronous execution of a data merging operation and a host writing operation according to an exemplary embodiment of the invention.

FIG. 11 is a schematic diagram illustrating synchronous execution of a data merging operation and a host writing operation according to an exemplary embodiment of the invention. Referring to FIG. 11, continuing with the exemplary embodiment of FIG. 10D, in a next data merging operation, a source unit 1101 may include physical units A-D, and valid data may be copied or moved from the source unit 1101 to a target unit. Thereafter, a host writing operation with a writing performance of 4 SLCs may be used to store data into the erased physical units A-D. Deduced by analogy, the source units 1102-1109 may be sequentially used in multiple data merging operations, and corresponding host writing operations may be performed. For details of related operations, reference may be made to the exemplary embodiments of FIG. 9 to FIG. 10D, and details thereof are not repeated here.

Figure 12:
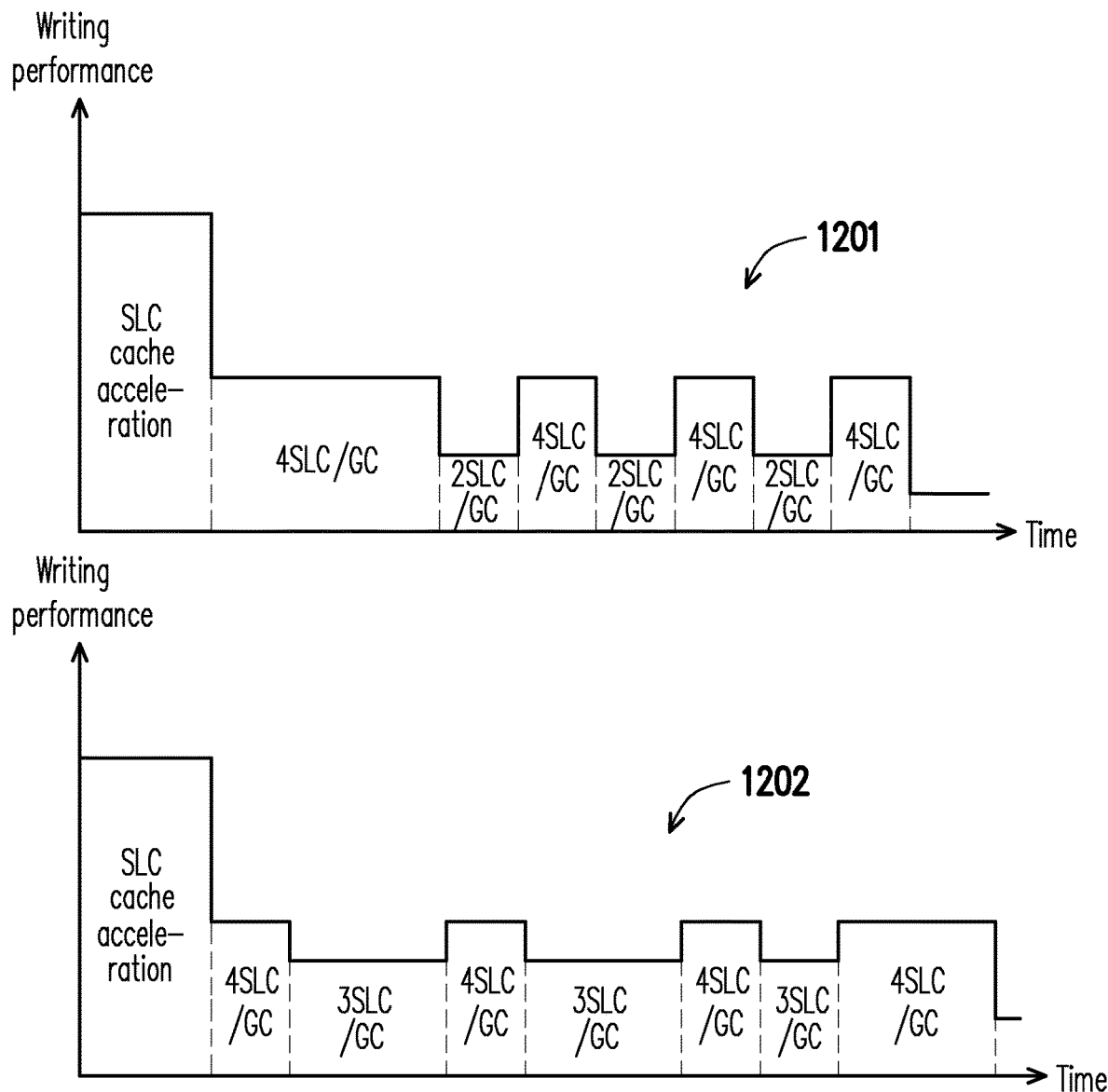
FIG. 12 is a schematic diagram illustrating a writing performance of a host writing operation according to an exemplary embodiment of the invention.

FIG. 12 is a schematic diagram illustrating a writing performance of a host writing operation according to an exemplary embodiment of the invention. Referring to FIG. 12, a performance curve 1201 represents writing performance of the host writing operation at different time points during continuous host writing operation without configuring the reserved region 621 as shown in FIG. 9. According to the performance curve 1201, if the reserved region 621 as shown in FIG. 9 is not configured, during the continuous host writing operation, at an initial stage of data writing, data may be quickly written into the cache region 61 in FIG. 9. At this time, the writing performance of the host writing operation is the highest (marked as SLC cache acceleration in FIG. 12). However, after the physical units in the cache region 61 are heavily used, the writing performance of the host writing operation performed along with the data merging operation begins to oscillate significantly between the writing performance of 4 SLCs and the writing performance of 2 SLCs, resulting in very unstable writing performance of the host writing operation.

On the other hand, a performance curve 1202 represents data writing performance of the host writing operation at different time points during continuous host writing operation in the case of additionally configuring the reserved region 621 as shown in FIG. 9. According to the performance curve 1202, in the case of additionally configuring the reserved region 621 as shown in FIG. 9, during continuous host write operation, even after the physical units in the cache region 61 are heavily used, the writing performance of the host writing operation performed along with the data merging operation may still be maintained between the writing performance of 3 SLCs and the writing performance of 4 SLCs. Therefore, in the case of additionally configuring the reserved region 621 as shown in FIG. 9, even if the data merging operation is started, the writing performance of the host writing operation may still be kept stable.

Figure 13:
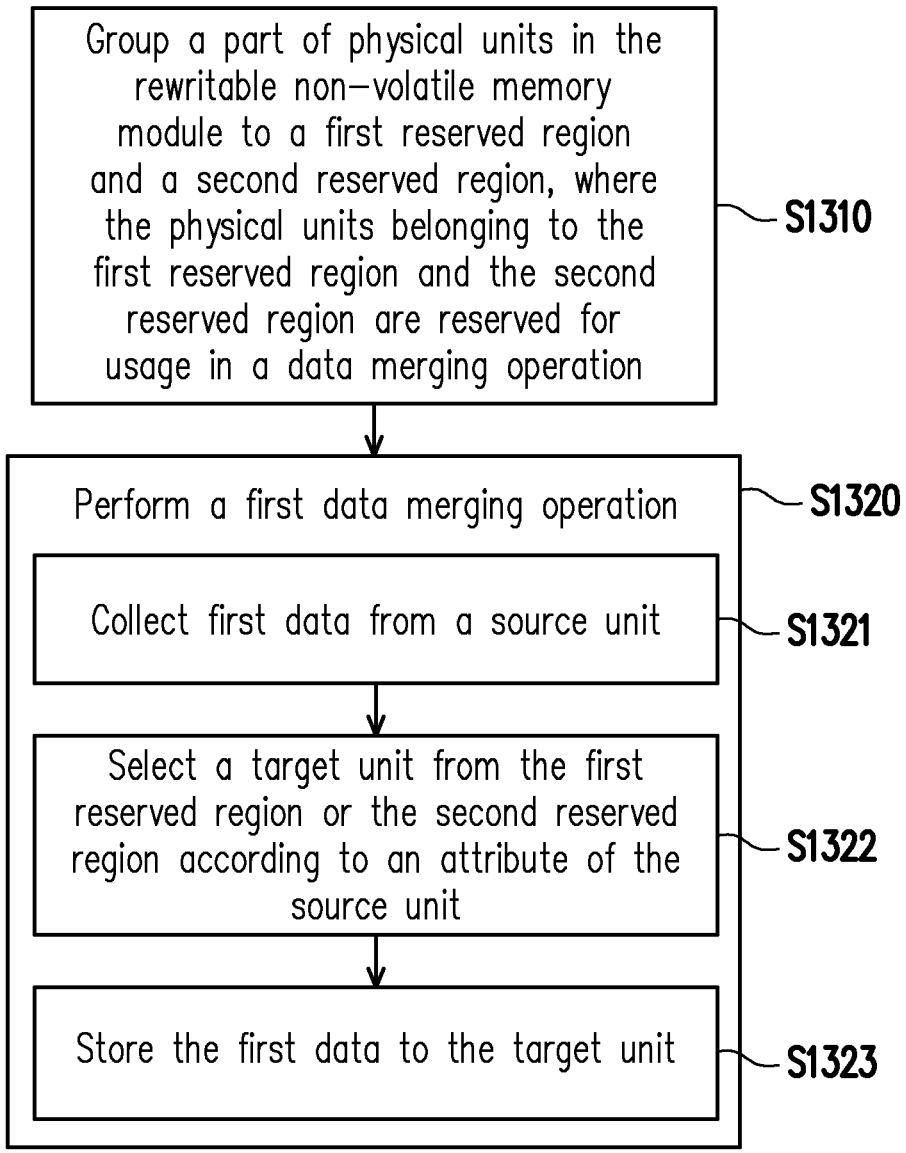
FIG. 13 is a flowchart of a memory management method according to an exemplary embodiment of the invention.

FIG. 13 is a flowchart of a memory management method according to an exemplary embodiment of the invention. Referring to FIG. 13, in step S1310, a part of physical units in a rewritable non-volatile memory module are grouped into a first reserved region and a second reserved region, where the physical units belonging to the first reserved region and the second reserved region are reserved for usage in a data merging operation. In step S1320, a first data merging operation is performed. The step S1320 may include steps S1321-S1323. In step S1321, first data is collected from a source unit. In step S1322, a target unit is selected from the first reserved region or the second reserved region according to an attribute of the source unit. In step S1323, the first data is stored to the target unit.

However, each step in FIG. 13 has been described in detail above, so that details thereof are not repeated here. It should be noted that each step in FIG. 13 may be implemented as multiple program codes or circuits, which is not limited by the invention. In addition, the method in FIG. 13 may be used in collaboration with the above exemplary embodiments, or may be used alone, which is not limited by the invention.

In summary, the memory management method, the memory storage device and the memory control circuit unit provided by the exemplary embodiments of the invention may be configured with the first reserved region and the second reserved region. The physical units in the first reserved region and the second reserved region are reserved for usage in the data merging operation. After starting the data merging operation, the target unit is selected from the first reserved region and the second reserved region according to the attribute of the source unit to perform data moving (or copy) operation, which may effectively improve stability of the writing performance of the synchronously performed host writing operation.

It will be apparent to those skilled in the art that various modifications and variations can be made to the disclosed embodiments without departing from the scope or spirit of the invention. In view of the foregoing, it is intended that the invention covers modifications and variations provided they fall within the scope of the following claims and their equivalents.

What is claimed is:

1. A memory management method, applied to a rewritable non-volatile memory module, wherein the rewritable non-volatile memory module comprises a plurality of physical units, the physical units comprise a plurality of first type physical units and a plurality of second type physical units, the first type physical units adopt a first operation mode, the second type physical units adopt a second operation mode, and the memory management method comprises:

grouping a part of physical units in the second type physical units to a first reserved region and a second reserved region, wherein the physical units belonging to the first reserved region and the second reserved region are reserved for usage in a data merging operation; and performing a first data merging operation, comprising:
collecting first data from a source unit in the physical units;
selecting a target unit from the first reserved region or the second reserved region according to an attribute of the source unit; and
storing the first data to the target unit.

2. The memory management method according to claim 1, wherein the physical units adopting the first operation mode are only programmed based on a first programming mode, and the physical units adopting the second operation mode are programmed based on one of the first programming mode and a second programming mode.

3. The memory management method according to claim 2, wherein in one physical unit programmed based on the first programming mode, one memory cell is used to store n bits,
in one physical unit programmed based on the second programming mode, one memory cell is used to store m bits, and n is smaller than m.

4. The memory management method according to claim 1, wherein the attribute of the source unit reflects whether each of the physical units in the source unit adopts the first operation mode or the second operation mode.

5. The memory management method according to claim 4, wherein selecting the target unit from the first reserved region or the second reserved region according to the attribute of the source unit comprises:
selecting at least one physical unit from the first reserved region to serve as the target unit in response to the physical units in the source unit adopting the first operation mode; and
selecting at least one physical unit from the second reserved region to serve as the target unit in response to at least one physical unit in the source unit not adopting the first operation mode.

6. The memory management method according to claim 1, further comprising:
removing the target unit from the first reserved region or the second reserved region after storing the first data to the target unit.

7. The memory management method according to claim 1, further comprising:
erasing the source unit after storing the first data to the target unit;
receiving a writing command from a host system, wherein the writing command instructs to store second data; and
storing the second data to the erased source unit according to the writing command after erasing the source unit.

8. The memory management method according to claim 1, further comprising:
erasing the source unit after storing the first data to the target unit; and
setting at least one physical unit in the erased source unit as a target unit used in a second data merging operation.

9. A memory storage device, comprising:
a connection interface unit configured to be coupled to a host system;
a rewritable non-volatile memory module; and
a memory control circuit unit coupled to the connection interface unit and the rewritable non-volatile memory module,
wherein the rewritable non-volatile memory module comprises a plurality of physical units, the physical units comprise a plurality of first type physical units and a plurality of second type physical units, the first type physical units adopt a first operation mode, and the second type physical units adopt a second operation mode,
the memory control circuit unit is configured to:
group a part of physical units in the second type physical units to a first reserved region and a second reserved region, wherein the physical units belonging to the first reserved region and the second reserved region are reserved for usage in a data merging operation; and
perform a first data merging operation, comprising:
instructing to collect first data from a source unit in the physical units;
selecting a target unit from the first reserved region or the second reserved region according to an attribute of the source unit; and
instructing to store the first data to the target unit.

10. The memory storage device according to claim 9, wherein the physical units adopting the first operation mode are only programmed based on a first programming mode, and the physical units adopting the second operation mode are programmed based on one of the first programming mode and a second programming mode.

11. The memory storage device according to claim 10, wherein in one physical unit programmed based on the first programming mode, one memory cell is used to store n bits,
in one physical unit programmed based on the second programming mode, one memory cell is used to store m bits, and n is smaller than m.

12. The memory storage device according to claim 9, wherein the attribute of the source unit reflects whether each of the physical units in the source unit adopts the first operation mode or the second operation mode.

13. The memory storage device according to claim 12, wherein an operation of the memory control circuit unit selecting the target unit from the first reserved region or the second reserved region according to the attribute of the source unit comprises:
selecting at least one physical unit from the first reserved region to serve as the target unit in response to the physical units in the source unit adopting the first operation mode; and
selecting at least one physical unit from the second reserved region to serve as the target unit in response to at least one physical unit in the source unit not adopting the first operation mode.

14. The memory storage device according to claim 9, wherein the memory control circuit unit is further configured to:
remove the target unit from the first reserved region or the second reserved region after storing the first data to the target unit.

15. The memory storage device according to claim 9, wherein the memory control circuit unit is further configured to:
instruct to erase the source unit after storing the first data to the target unit;
receive a writing command from the host system, wherein the writing command instructs to store second data; and
instruct to store the second data to the erased source unit according to the writing command after erasing the source unit.

16. The memory storage device according to claim 9, wherein the memory control circuit unit is further configured to:
 instruct to erase the source unit after storing the first data to the target unit; and
 set at least one physical unit in the erased source unit as a target unit used in a second data merging operation.

17. A memory control circuit unit, configured to control a rewritable non-volatile memory module, wherein the rewritable non-volatile memory module comprises a plurality of physical units, the physical units comprise a plurality of first type physical units and a plurality of second type physical units, the first type physical units adopt a first operation mode, the second type physical units adopt a second operation mode, and the memory control circuit unit comprises:
 a host interface configured to be coupled to a host system;
 a memory interface configured to be coupled to the rewritable non-volatile memory module; and
 a memory management circuit coupled to the host interface and the memory interface,
 wherein the memory management circuit is configured to:
  group a part of physical units in the second type physical units to a first reserved region and a second reserved region, wherein the physical units belonging to the first reserved region and the second reserved region are reserved for usage in a data merging operation; and
  perform a first data merging operation, comprising:
   instructing to collect first data from a source unit in the physical units;
   selecting a target unit from the first reserved region or the second reserved region according to an attribute of the source unit; and
   instructing to store the first data to the target unit.

18. The memory control circuit unit according to claim 17, wherein the physical units adopting the first operation mode are only programmed based on a first programming mode, and the physical units adopting the second operation mode are programmed based on one of the first programming mode and a second programming mode.

19. The memory control circuit unit according to claim 18, wherein in one physical unit programmed based on the first programming mode, one memory cell is used to store n bits, in one physical unit programmed based on the second programming mode, one memory cell is used to store m bits, and n is smaller than m.

20. The memory control circuit unit according to claim 17, wherein the attribute of the source unit reflects whether each of the physical units in the source unit adopts the first operation mode or the second operation mode.

21. The memory control circuit unit according to claim 20, wherein an operation of the memory management circuit selecting the target unit from the first reserved region or the second reserved region according to the attribute of the source unit comprises:
 selecting at least one physical unit from the first reserved region to serve as the target unit in response to the physical units in the source unit adopting the first operation mode; and
 selecting at least one physical unit from the second reserved region to serve as the target unit in response to at least one physical unit in the source unit not adopting the first operation mode.

22. The memory control circuit unit according to claim 17, wherein the memory management circuit is further configured to:
 remove the target unit from the first reserved region or the second reserved region after storing the first data to the target unit.

23. The memory control circuit unit according to claim 17, wherein the memory management circuit is further configured to:
 instruct to erase the source unit after storing the first data to the target unit;
 receive a writing command from the host system, wherein the writing command instructs to store second data; and
 instruct to store the second data to the erased source unit according to the writing command after erasing the source unit.

24. The memory control circuit unit according to claim 17, wherein the memory management circuit is further configured to:
 instruct to erase the source unit after storing the first data to the target unit; and
 set at least one physical unit in the erased source unit as a target unit used in a second data merging operation.

* * * * *